US010814905B2

(12) United States Patent
Sohal et al.

(10) Patent No.: US 10,814,905 B2
(45) Date of Patent: Oct. 27, 2020

(54) ELECTRIC POWER ASSISTED STEERING SYSTEMS FOR SOLID AXLE FRONT SUSPENSION VEHICLES

(71) Applicant: Ford Global Technologies, LLC, Dearborn, MI (US)

(72) Inventors: Jaspal Sohal, Canton, MI (US); Joseph Skynar, Milford, MI (US); Stephen Dockstader, South Lyon, MI (US); Paul Robert Longworth, Ann Arbor, MI (US); Christopher Rolls, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 313 days.

(21) Appl. No.: 15/985,358

(22) Filed: May 21, 2018

(65) Prior Publication Data

US 2019/0351937 A1    Nov. 21, 2019

(51) Int. Cl.
| | |
|---|---|
| *B62D 5/04* | (2006.01) |
| *B62D 7/14* | (2006.01) |
| *B62D 7/20* | (2006.01) |
| *B62D 3/08* | (2006.01) |
| *B62D 7/18* | (2006.01) |

(52) U.S. Cl.
CPC ............. *B62D 5/0448* (2013.01); *B62D 3/08* (2013.01); *B62D 5/0412* (2013.01); *B62D 5/0463* (2013.01); *B62D 7/146* (2013.01); *B62D 7/18* (2013.01); *B62D 7/20* (2013.01)

(58) Field of Classification Search
CPC ...... B62D 3/12; B62D 5/0448; B62D 5/0421; B62D 7/146; B62D 7/18; B62D 7/1545; B62D 7/08; B62D 7/20
See application file for complete search history.

(56) References Cited

U.S. PATENT DOCUMENTS

| | | | | |
|---|---|---|---|---|
| 4,279,428 A | * | 7/1981 | Onodera ................ | B62D 7/22 |
| | | | | 280/124.108 |
| 4,804,057 A | | 2/1989 | Saeed | |
| 6,510,917 B2 | * | 1/2003 | Cole .................... | B62D 5/0418 |
| | | | | 180/436 |

(Continued)

FOREIGN PATENT DOCUMENTS

| | | |
|---|---|---|
| CN | 106800040 | 6/2017 |
| JP | 5870811 | 3/2016 |
| KR | 100211377 | 8/1999 |

*Primary Examiner* — Joseph M Rocca
*Assistant Examiner* — Harold Eric Pahlck, III
(74) *Attorney, Agent, or Firm* — Ray Coppiellie; Hanley, Flight & Zimmerman, LLC (57) ABSTRACT

Electric power assisted steering (EPAS) systems for solid axle front suspension vehicles are described. An example EPAS system includes an idler arm having a first end and a second end. The first end of the idler arm is coupled to a frame of the vehicle. The example EPAS system further includes an EPAS rack assembly having an input shaft, a rack, an electric motor, and an output link. The rack is coupled to the input shaft and is movable in response to movement of the input shaft. The electric motor is coupled to the rack. The electric motor provides powered assistance to movement of the rack. The output link has a first end and a second end. The first end of the output link is coupled to the rack. The second end of the output link is coupled to the second end of the idler arm.

20 Claims, 7 Drawing Sheets

(56) References Cited

U.S. PATENT DOCUMENTS

| | | | |
|---|---|---|---|
| 7,077,234 B2* | 7/2006 | Klais | B62D 3/12 |
| | | | 180/428 |
| 8,893,846 B2* | 11/2014 | Buchwitz | B62D 5/04 |
| | | | 180/428 |
| 9,446,788 B2* | 9/2016 | Yamaguchi | F16H 25/2223 |
| 2014/0224566 A1* | 8/2014 | Buchwitz | B62D 5/04 |
| | | | 180/444 |
| 2017/0297611 A1 | 10/2017 | Raad et al. | |

* cited by examiner

ELECTRIC POWER ASSISTED STEERING SYSTEMS FOR SOLID AXLE FRONT SUSPENSION VEHICLES

FIELD OF THE DISCLOSURE

This disclosure relates generally to electric power assisted steering (EPAS) systems and, more specifically, to EPAS systems for solid axle front suspension vehicles.

BACKGROUND

Vehicles such as trucks (e.g., light-duty, medium-duty, heavy-duty and/or super-duty trucks), sport utility vehicles, and off-road vehicles commonly include a solid axle (e.g., solid beam, rigid beam, mono-beam, etc.) front suspension for durability. Solid axle front suspensions are traditionally paired with hydraulically-operated recirculating ball nut gear systems. Such hydraulically-operated recirculating ball nut gear systems tend to be heavy and costly, while also typically providing for relatively limited performance features.

SUMMARY

In some examples, an EPAS system for a solid axle front suspension of a vehicle is disclosed. In some disclosed examples, the EPAS system comprises an idler arm having a first end and a second end. In some disclosed examples, the first end of the idler arm is coupled to a frame of the vehicle. In some disclosed examples, the EPAS system further comprises an EPAS rack assembly. In some disclosed examples, the EPAS rack assembly includes an input shaft, a rack, an electric motor, and an output link. In some disclosed examples, the rack is coupled to the input shaft and is movable in response to movement of the input shaft. In some disclosed examples, the electric motor is coupled to the rack. In some disclosed examples, the electric motor is to provide powered assistance to movement of the rack. In some disclosed examples, the output link has a first end and a second end. In some disclosed examples, the first end of the output link is coupled to the rack. In some disclosed examples, the second end of the output link is coupled to the second end of the idler arm.

In some examples, an EPAS system for a solid axle front suspension of a vehicle is disclosed. In some disclosed examples, the EPAS system comprises an idler arm having a first end and a second end. In some disclosed examples, the first end of the idler arm is coupled to a frame of the vehicle. In some disclosed examples, the EPAS system further comprises an EPAS rack assembly mounted to the frame of the vehicle. In some disclosed examples, the EPAS rack assembly includes an input shaft, a rack, an electric motor, and an output link. In some disclosed examples, the input shaft is located on a driver side of the vehicle. In some disclosed examples, the rack is coupled to the input shaft and is movable in response to movement of the input shaft. In some disclosed examples, the electric motor is coupled to the rack. In some disclosed examples, the electric motor is to provide powered assistance to movement of the rack. In some disclosed examples, the output link is located on a passenger side of the vehicle. In some disclosed examples, the output link has a first end and a second end. In some disclosed examples, the first end of the output link is coupled to the rack. In some disclosed examples, the second end of the output link is coupled to the second end of the idler arm.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Solid axle front suspensions are exceptionally durable and are accordingly desirable for implementation in vehicles such as trucks (e.g., light-duty, medium-duty, heavy-duty and/or super-duty trucks), sport utility vehicles, and off-road vehicles, among others. The hydraulically-operated recirculating ball nut gear systems with which such solid axle front suspensions are traditionally paired, however, have numerous drawbacks. For example, hydraulically-operated recirculating ball nut gear systems tend to be heavy and costly, while also typically providing for relatively limited performance features. Hydraulically-operated recirculating ball nut gear systems also create significant compliance burdens for the steering system.

Unlike the known solid axle front suspensions described above that are paired with hydraulically-operated recirculating ball nut gear systems, the solid axle front suspensions disclosed herein are advantageously paired with EPAS systems. The disclosed EPAS systems provide for numerous positive tradeoffs relative to conventional hydraulically-operated recirculating ball nut gear systems. For example, in comparison to such hydraulically-operated recirculating ball nut gear systems, the EPAS systems disclosed herein are relatively lighter and less costly, while also advantageously providing for a broader array of performance features, including driver assist features not available via such hydraulically-operated recirculating ball nut gear systems. Implementing the disclosed EPAS systems in lieu of such hydraulically-operated recirculating ball nut gear systems also advantageously reduces the compliance burdens associated with the steering system.

Figure 1:
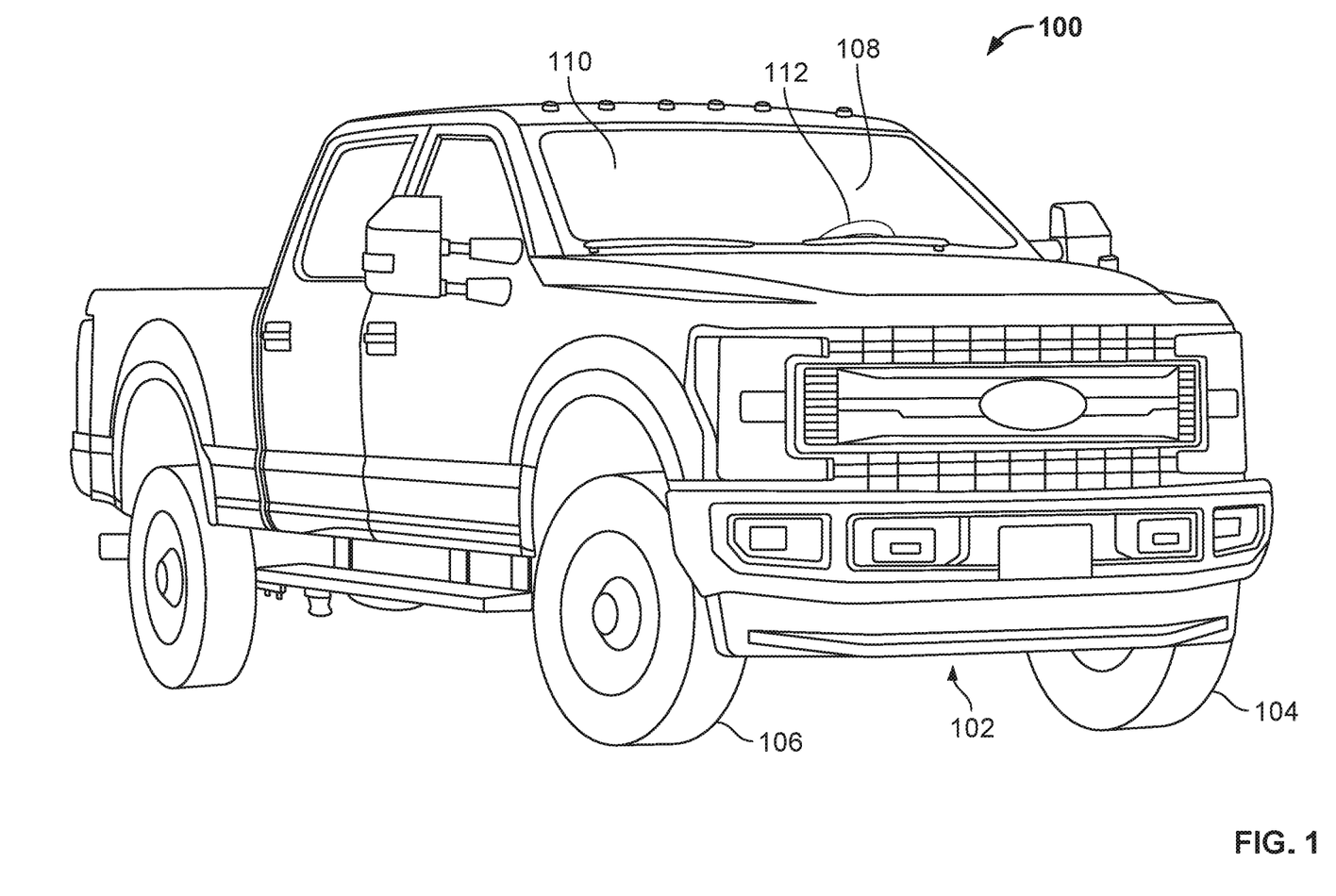
FIG. 1 illustrates an example vehicle including an example solid axle front suspension with which an EPAS system may be implemented in accordance with the teachings of this disclosure.

FIG. 1 illustrates an example vehicle 100 including an example solid axle front suspension 102 with which an EPAS system may be implemented in accordance with the teachings of this disclosure. The vehicle 100 of FIG. 1 is a super-duty truck. In other examples, the vehicle 100 may be a different type of vehicle, such as a light-duty, medium-duty, or heavy-duty truck, a sport utility vehicle, an off-road vehicle, a van, a car, etc. The solid axle front suspension 102 includes a solid axle located and/or extending between an example left front wheel 104 and an example right front wheel 106 of the vehicle 100. The solid axle may be implemented as a solid beam, a rigid beam, a mono-beam, etc., and may further be implemented as either a live beam or a dead beam.

As used herein, the term "live beam" refers to an axle or beam that transmits power to one or more wheel(s) of a vehicle. For example, the solid axle of the solid axle front suspension 102 of FIG. 1 may be a live beam that transmits power to the left and right front wheels 104, 106 of the vehicle. As used herein, the term "dead beam" refers to an axle or beam that does not transmit power to any wheels of a vehicle. For example, the solid axle of the solid axle front suspension 102 of FIG. 1 may be a dead beam that does not transmit power to any wheels of the vehicle 100, including the left and right front wheels 104, 106 of the vehicle 100.

In the illustrated example of FIG. 1, the vehicle 100 includes an example driver side 108 located above and/or behind the left front wheel 104 (e.g., on a left side of the vehicle 100), and further includes an example passenger side 110 located above and/or behind the right front wheel 106 (e.g., on a right side of the vehicle 100). The vehicle 100 includes an example steering wheel 112 located on the driver side 108. The steering wheel 112 is coupled to a steering column and one or more steering shaft(s) (e.g., an intermediate steering shaft, etc.) such that rotational motion of the steering wheel 112 is transferred to a steering system (e.g., an EPAS system) of the vehicle 100. In other examples, the respective orientations and/or locations of the driver side 108 and the passenger side 110 may be reversed from that shown in FIG. 1, and the steering wheel 112 may accordingly be located on the right side of the vehicle 100.

Figure 2:
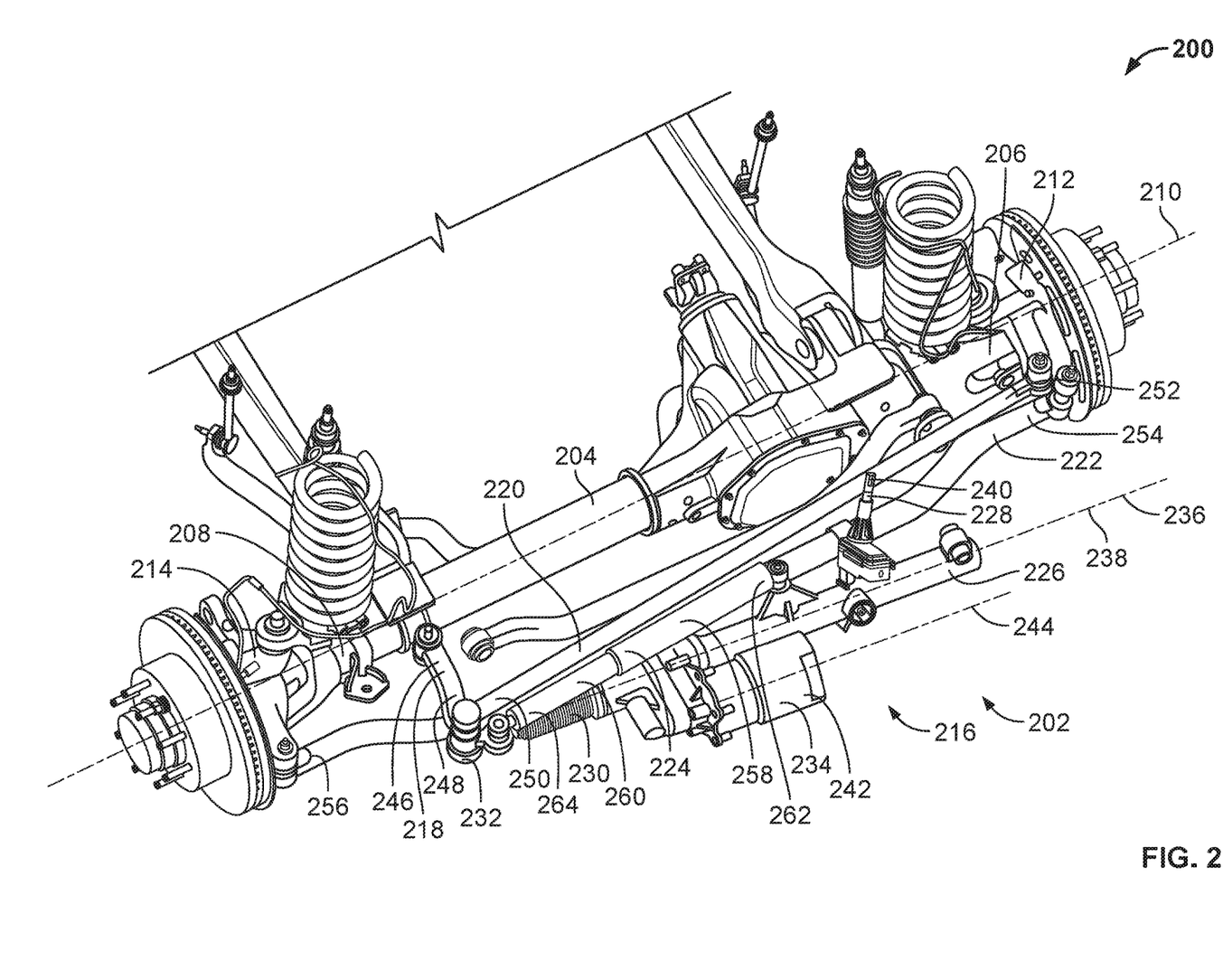
FIG. 2 is a perspective view of an example solid axle front suspension paired with an example EPAS system constructed in accordance with the teachings of this disclosure.
Figure 3:
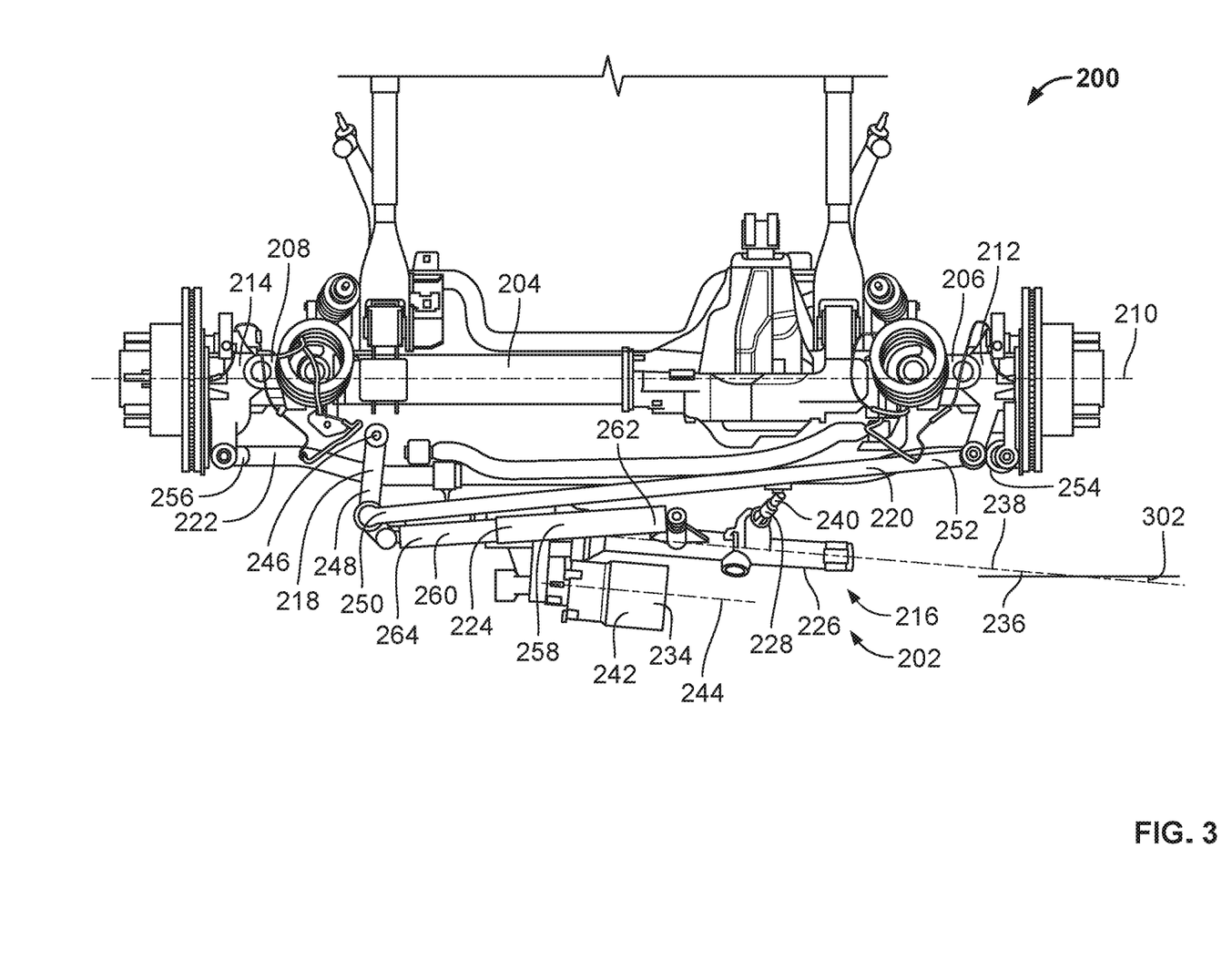
FIG. 3 is a top view of the example solid axle front suspension and the example EPAS system of FIG. 2.
Figure 4:
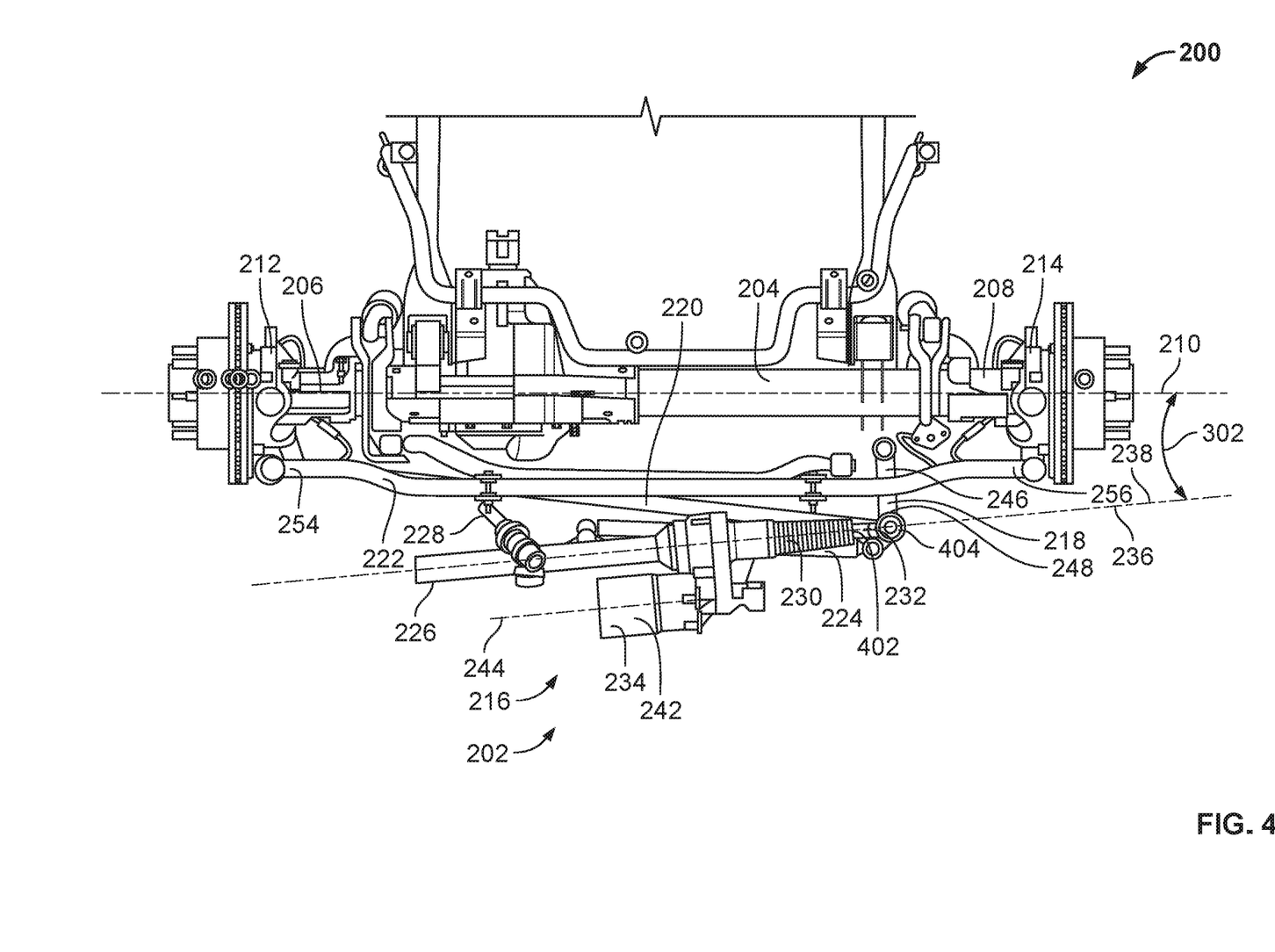
FIG. 4 is a bottom view of the example solid axle front suspension and the example EPAS system of FIGS. 2 and 3.
Figure 5:
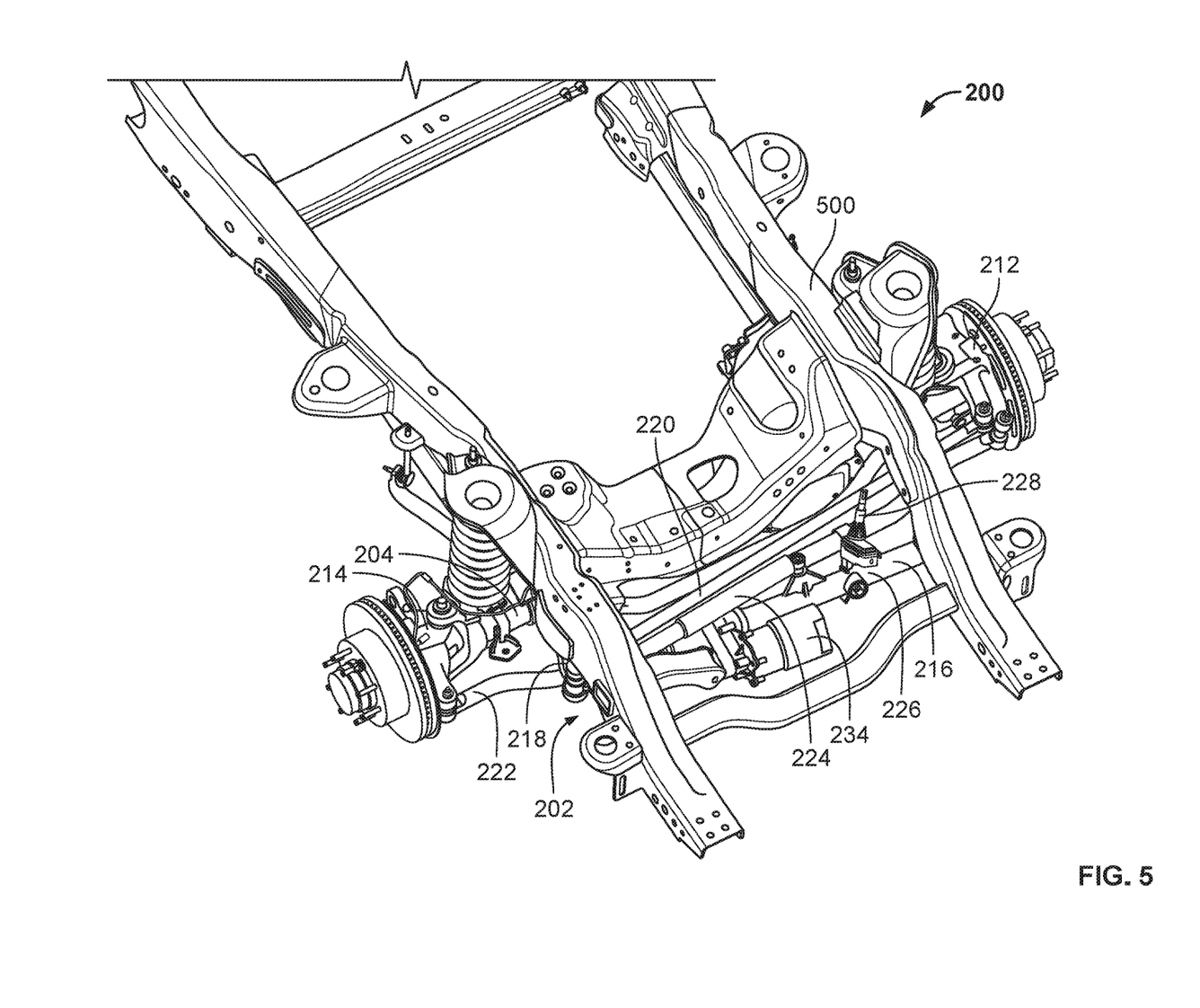
FIG. 5 is a perspective view of the example solid axle front suspension and the example EPAS system of FIGS. 2-4 mounted to an example frame of a vehicle.
Figure 6:
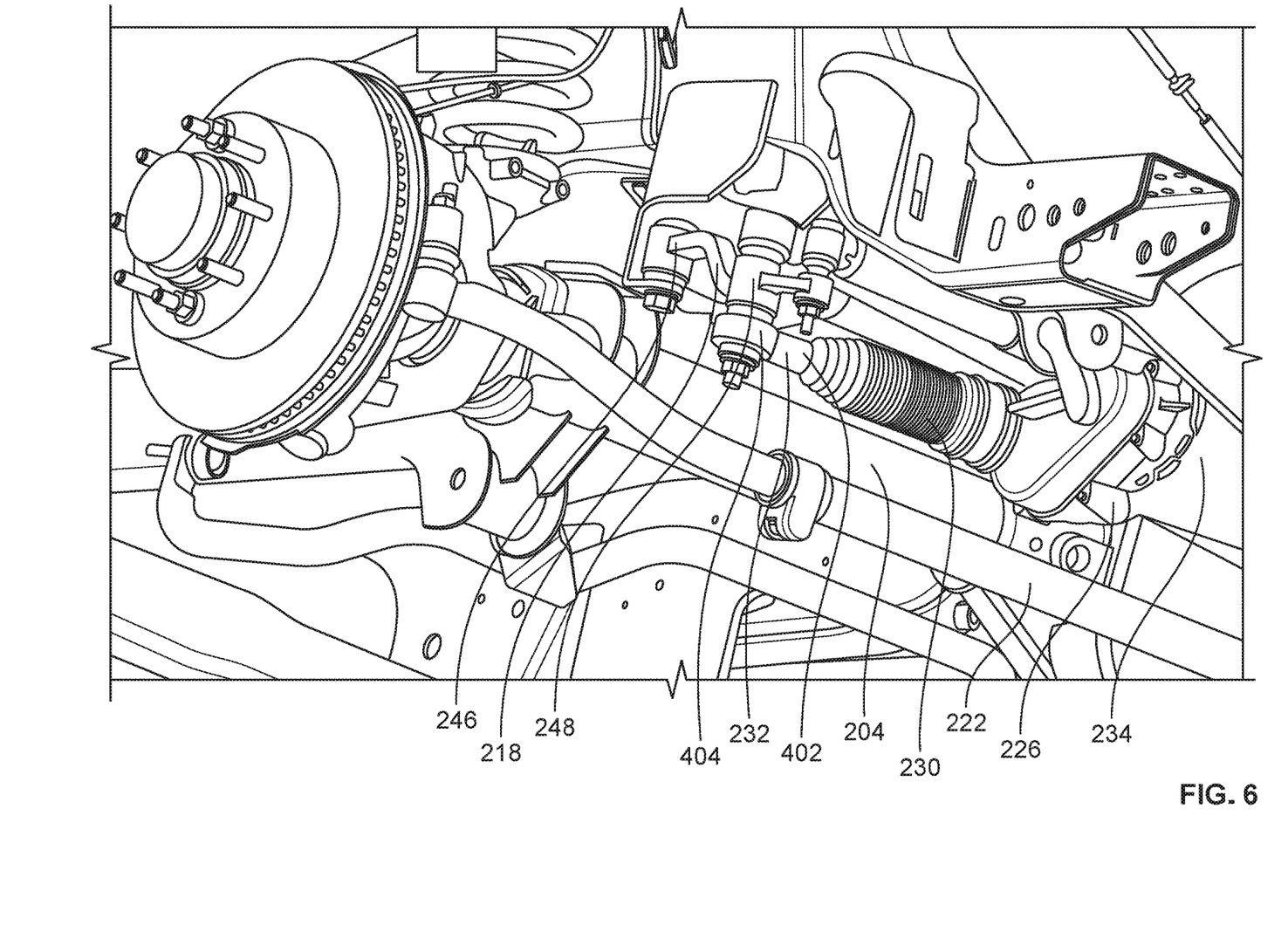
FIG. 6 is another perspective view of the example solid axle front suspension, the example EPAS system, and the example frame of FIGS. 2-5.

FIG. 2 is a perspective view of an example solid axle front suspension 200 paired with an example EPAS system 202 constructed in accordance with the teachings of this disclosure. FIG. 3 is a top view of the example solid axle front suspension 200 and the example EPAS system 202 of FIG. 2. FIG. 4 is a bottom view of the example solid axle front suspension 200 and the example EPAS system 202 of FIGS. 2 and 3. FIG. 5 is a perspective view of the example solid axle front suspension 200 and the example EPAS system 202 of FIGS. 2-4 mounted to an example frame 500 of a vehicle. FIG. 6 is another perspective view of the example solid axle front suspension 200, the example EPAS system 202, and the example frame 500 of FIGS. 2-5.

The solid axle front suspension 200 and the EPAS system 202 of FIGS. 2-6 may be implemented in a vehicle such as the vehicle 100 of FIG. 1 described above. The implementation of the EPAS system 202 may occur in the absence and/or to the exclusion of a conventional hydraulically-operated recirculating ball nut gear system, thereby providing the vehicle with the positive tradeoffs described above (e.g., reduced weight, reduced cost, improved performance features, reduced steering system compliance, etc.).

In the illustrated example of FIGS. 2-6, the solid axle front suspension 200 includes an example solid axle 204 (e.g., a solid beam, rigid beam, mono-beam, etc.) implemented as a live beam. The solid axle 204 of FIGS. 2-6 includes an example first end 206, an example second end 208 located opposite the first end 206 of the solid axle 204, and an example longitudinal axis 210 extending between the first end 206 and the second end 208 of the solid axle 204. The first end 206 of the solid axle 204 of FIGS. 2-6 is coupled to an example first knuckle 212 (e.g., a left knuckle) of the vehicle associated with a first front wheel (e.g., a left front wheel) of the vehicle. The second end 208 of the solid axle 204 of FIGS. 2-6 is coupled to an example second knuckle 214 (e.g., a right knuckle) of the vehicle associated with a second front wheel (e.g., a right front wheel) of the vehicle.

The EPAS system 202 of FIGS. 2-6 includes an example EPAS rack assembly 216, an example idler arm 218, an example drag link 220, an example tie rod 222, and an example steering damper 224. The EPAS rack assembly 216 of FIGS. 2-6 is coupled and/or mounted to the frame 500 of the vehicle such that the EPAS rack assembly 216 is generally oriented in a direction extending along the longitudinal axis 210 of the solid axle 204 of FIGS. 2-6, as further described below. The EPAS rack assembly 216 of FIGS. 2-6 includes an example rack housing 226, an example input shaft 228, an example rack 230, an example output link 232, and an example electric motor 234.

The rack housing 226 of the EPAS rack assembly 216 of FIGS. 2-6 is coupled and/or mounted to the frame 500 of the vehicle. The rack housing 226 of FIGS. 2-6 houses and/or partially contains the rack 230 of the EPAS rack assembly 216. In the illustrated example of FIGS. 2-6, the rack housing 226 includes an example longitudinal axis 236 defined by an example longitudinal axis 238 and/or a direction of movement of the rack 230. As shown in FIGS. 3 and 4, the longitudinal axis 236 of the rack housing 226 and/or the longitudinal axis 238 of the rack 230 of FIGS. 2-6 is/are oriented at an example angle 302 relative to the longitudinal axis 210 of the solid axle 204 of FIGS. 2-6. In the illustrated example of FIGS. 2-6, the angle 302 has a value of approximately ten degrees (10°). In other examples, the value of the angle 302 may be between zero degrees (0°) and thirty degrees (30°).

The input shaft 228 of the EPAS rack assembly 216 of FIGS. 2-6 is rotatable relative to the rack housing 226 of the EPAS rack assembly 216. The input shaft 228 of FIGS. 2-6 includes an example first end 240 and a second end located opposite the first end 240 of the input shaft 228. In some examples, the first end 240 of the input shaft 228 of FIGS. 2-6 is coupled to an intermediate steering shaft of the vehicle. The intermediate steering shaft transfers rotational motion from a steering wheel and/or one or more other steering shaft(s) of the vehicle to the input shaft 228 of the EPAS rack assembly 216 of FIGS. 2-6. In other examples, the first end 240 of the input shaft 228 of FIGS. 2-6 is coupled to a steering actuator of a steer-by-wire steering system of the vehicle. The steering actuator provides rotational motion to the input shaft 228 of the EPAS rack assembly 216 of FIGS. 2-6 based on one or more signal(s) received at the steering actuator, with the signal(s) being based on steering data detected at a feedback actuator of the steer-by-wire steering system. In other steer-by-wire steering system examples, the input shaft 228 of the EPAS rack assembly 216 of FIGS. 2-6 may be eliminated. In such other examples, movement of the rack 230 of the EPAS rack assembly 216 may occur via a ball nut assembly or a concentric motor operatively coupled to the electric motor 234 of the EPAS rack assembly 216. In such other examples, the ball nut assembly or the concentric motor operates based on one or more received control signal(s), with the control signal(s) being based on steering data detected at the feedback actuator of the steer-by-wire steering system.

In the illustrated example of FIGS. 2-6, the input shaft 228 is located on a driver side of the vehicle (e.g., the driver side 108 of the vehicle 100 of FIG. 1). The second end of the input shaft 228 of FIGS. 2-6 includes and/or is operatively coupled to a pinion gear located within the rack housing 226 of the EPAS rack assembly 216. In some examples, the pinion gear may be integrally formed with and/or at the second end of the input shaft 228. The pinion gear engages, meshes with, and/or drives the rack 230 of the EPAS rack assembly 216. The rack 230 of the EPAS rack assembly 216 of FIGS. 2-6 is slidable relative to the rack housing 226 of the EPAS rack assembly 216. The input shaft 228, the pinion gear, and the rack 230 of the EPAS rack assembly 216 are operatively coupled such that the pinion gear moves (e.g., rotates) in response to movement (e.g., rotation) of the input shaft 228, and the rack 230 moves (e.g., translates and/or slides) in response to movement (e.g., rotation) of the pinion gear.

The output link 232 of the EPAS rack assembly 216 of FIGS. 2-6 includes an example first end 402 and an example second end 404 located opposite the first end 402 of the output link 232. The first end 402 of the output link 232 of FIGS. 2-6 is coupled (e.g., rigidly and non-rotatably coupled) to the rack 230 of the EPAS rack assembly 216 such that output link 232 moves (e.g. translates and/or slides) along with the rack 230. In some examples, the output link 232 (e.g., the first end 402 of the output link 232) of the EPAS rack assembly 216 of FIGS. 2-6 may be integrally formed with rack 230 of the EPAS rack assembly 216. The second end 404 of the output link 232 of FIGS. 2-6 is coupled to the idler arm 218 of FIGS. 2-6, as further described below. In the illustrated example of FIGS. 2-6, the output link 232 and the idler arm 218 are located on a passenger side of the vehicle (e.g., the passenger side 110 of the vehicle 100 of FIG. 1). The rack 230, the output link 232, and the idler arm 218 are operatively coupled such that the output link 232 moves (e.g., translates and/or slides) in response to movement (e.g., translation and/or sliding) of the rack 230, and the idler arm 218 moves (e.g., pivots and/or rotates) in response to movement (e.g., translation and/or sliding) of the output link 232.

The electric motor 234 of the EPAS rack assembly 216 of FIGS. 2-6 provides powered assistance to movement of the rack 230 of the EPAS rack assembly 216. In some examples, the level and/or extent of powered assistance provided by the electric motor 234 may be controlled and/or regulated via a controller of the EPAS system 202. In some examples, the level and/or extent of powered assistance provided by the electric motor 234 may be determined based on a steering input obtained from a steering wheel, a steering column, and/or a steering shaft (e.g. an intermediate steering shaft) of the vehicle, and/or obtained from the input shaft 228 of the EPAS rack assembly 216 of FIGS. 2-6. In other examples, the level and/or extent of powered assistance provided by the electric motor 234 may be determined based on a steering input obtained from a feedback actuator and/or a steering actuator, ball nut assembly, or concentric motor of a steer-by-wire steering system of the vehicle, and/or obtained from the input shaft 228 of the EPAS rack assembly 216 of FIGS. 2-6.

The electric motor 234 of the EPAS rack assembly 216 of FIGS. 2-6 includes an example motor housing 242 and an example drive axis 244. The motor housing 242 of the electric motor 234 of FIGS. 2-6 is coupled and/or mounted to the frame 500 of the vehicle and/or to the rack housing 226 of the EPAS rack assembly 216. The motor housing 242 houses and/or partially contains one or more operational and/or movable components of the electric motor 234. For example, the drive axis 244 of the electric motor 234 is defined by a drive shaft of the electric motor 234, with the drive shaft being housed by and/or partially contained within the motor housing 242 of the electric motor 234. The drive shaft of the electric motor 234 moves (e.g., rotates) in response to electric current provided to and/or generated at the electric motor 234. In the illustrated example of FIGS. 2-6, drive axis 244 of the electric motor 234 of FIGS. 2-6 is parallel to the longitudinal axis 236 of the rack housing 226 of FIGS. 2-6 and/or parallel to the longitudinal axis 238 of the rack 230 of FIGS. 2-6.

The electric motor 234 of the EPAS rack assembly 216 FIGS. 2-6 is operatively coupled to the rack 230 of the EPAS rack assembly 216. For example, the drive shaft of the electric motor 234 may be coupled to the rack 230 via a gear train such that movement of the drive shaft is transmitted through the gear train to the rack. In some examples, the gear train may be housed by and/or partially contained within the rack housing 226 and/or the motor housing 242. The rack 230, the gear train, and the electric motor 234 of the EPAS rack assembly 216 are operatively coupled such that the gear train moves (e.g. rotates) in response to movement (e.g., rotation) of the drive shaft of the electric motor 234, and the rack 230 moves (e.g., translates and/or slides) in response to movement (e.g., rotation) of the gear train.

The idler arm 218 of the EPAS system 202 of FIGS. 2-6 includes an example first end 246 and an example second end 248 located opposite the first end 246 of the idler arm 218. The first end 246 of the idler arm 218 of FIGS. 2-6 is coupled to the frame 500 of the vehicle. The second end 248 of the idler arm 218 of FIGS. 2-6 is coupled to the second end 404 of the output link 232 of the EPAS rack assembly 216 of FIGS. 2-6. The second end 248 of the idler arm 218 is also coupled the drag link 220 of FIGS. 2-6, as further described below. The output link 232, the idler arm 218, and the drag link 220 are operatively coupled such that the idler arm 218 moves (e.g., pivots and/or rotates) in response to movement (e.g., translation and/or sliding) of the output link 232, and the drag link 220 moves (e.g., pivots) in response to movement (e.g., pivoting and/or rotating) of the idler arm 218.

The drag link 220 of the EPAS system 202 of FIGS. 2-6 includes an example first end 250 and an example second end 252 located opposite the first end 250 of the drag link 220. The first end 250 of the drag link 220 of FIGS. 2-6 is coupled to the second end 248 of the idler arm 218 of FIGS. 2-6. The second end 252 of the drag link 220 of FIGS. 2-6 is coupled to the first knuckle 212 (e.g., left knuckle) of the vehicle. The idler arm 218, the drag link 220, and the first knuckle 212 are operatively coupled such that the drag link 220 moves (e.g., pivots) in response to movement (e.g., pivoting and/or rotating) of the idler arm 218, and the first knuckle 212 moves (e.g., pivots) in response to movement (e.g., pivoting) of the drag link 220.

The tie rod 222 of the EPAS system 202 of FIGS. 2-6 includes an example first end 254 and an example second end 256 located opposite the first end 254 of the tie rod 222. The first end 254 of the tie rod 222 of FIGS. 2-6 is coupled to the first knuckle 212 (e.g., left knuckle) of the vehicle. The second end 256 of the tie rod 222 of FIGS. 2-6 is coupled to the second knuckle 214 (e.g., right knuckle) of the vehicle. The first knuckle 212, the tie rod 222, and the second knuckle 214 are operatively coupled such that the tie rod 222 moves (e.g., pivots) in response to movement (e.g., pivoting) of the first knuckle 212 (e.g., as may occur in response to movement of the drag link 220), and the second knuckle 214 moves (e.g., pivots) in response to movement (e.g., pivoting) of the tie rod 222.

The steering damper 224 of the EPAS system 202 of FIGS. 2-6 dampens one or more of the above-described movement(s) of the idler arm 218, the drag link 220, and/or the tie rod 222 of FIGS. 2-6. The steering damper 224 of FIGS. 2-6 includes an example cylinder 258 and an example piston 260 that is movable (e.g. slidable) within and/or relative to the cylinder 258. In the illustrated example of FIGS. 2-6, an example first end 262 of the steering damper 224 formed by and/or coupled to the cylinder 258 of the steering damper 224 is coupled to the rack housing 226 of FIGS. 2-6, and an example second end 264 of the steering damper 224 formed by and/or coupled to the piston 260 of the steering damper 224 is coupled to the idler arm 218 of FIGS. 2-6. In some examples, the first end 262 of the steering damper 224 may alternatively be coupled to the frame 500 of the vehicle. In some examples, the second end 264 of the steering damper 224 may alternatively be coupled to the drag link 220 or the tie rod 222.

Thus, the input shaft 228 of FIGS. 2-6 moves (e.g., rotates) in response to movement (e.g., rotation) of the intermediate steering shaft of the vehicle (or in response to movement of the steering actuator, ball nut assembly, or concentric motor in the case of a steer-by-wire implementation), the rack 230 of FIGS. 2-6 moves (e.g., translates and/or slides) in response to movement of the input shaft 228, the output link 232 of FIGS. 2-6 moves (e.g., translates and/or slides) in response to movement of the rack 230, the idler arm 218 of FIGS. 2-6 moves (pivots and/or rotates) in response to movement of the output link 232, the drag link 220 of FIGS. 2-6 moves (e.g., pivots) in response to movement of the idler arm 218, the first knuckle 212 of FIGS. 2-6 moves (e.g., pivots) in response to movement of the drag link 220, the tie rod 222 of FIGS. 2-6 moves (e.g., pivots) in response to movement of the first knuckle 212, and the second knuckle 214 of FIGS. 2-6 moves (e.g., pivots) in response to movement of the tie rod 222. The solid axle 204 of FIGS. 2-6 extends between the first and second knuckles 212, 214. The electric motor 234 of FIGS. 2-6 provides powered assistance to the above-described movement of the rack 230. The steering damper 224 of FIGS. 2-6 dampens one or more of the above-described movement(s) of the idler arm 218, the drag link 220, and/or the tie rod 222.

Figure 7:
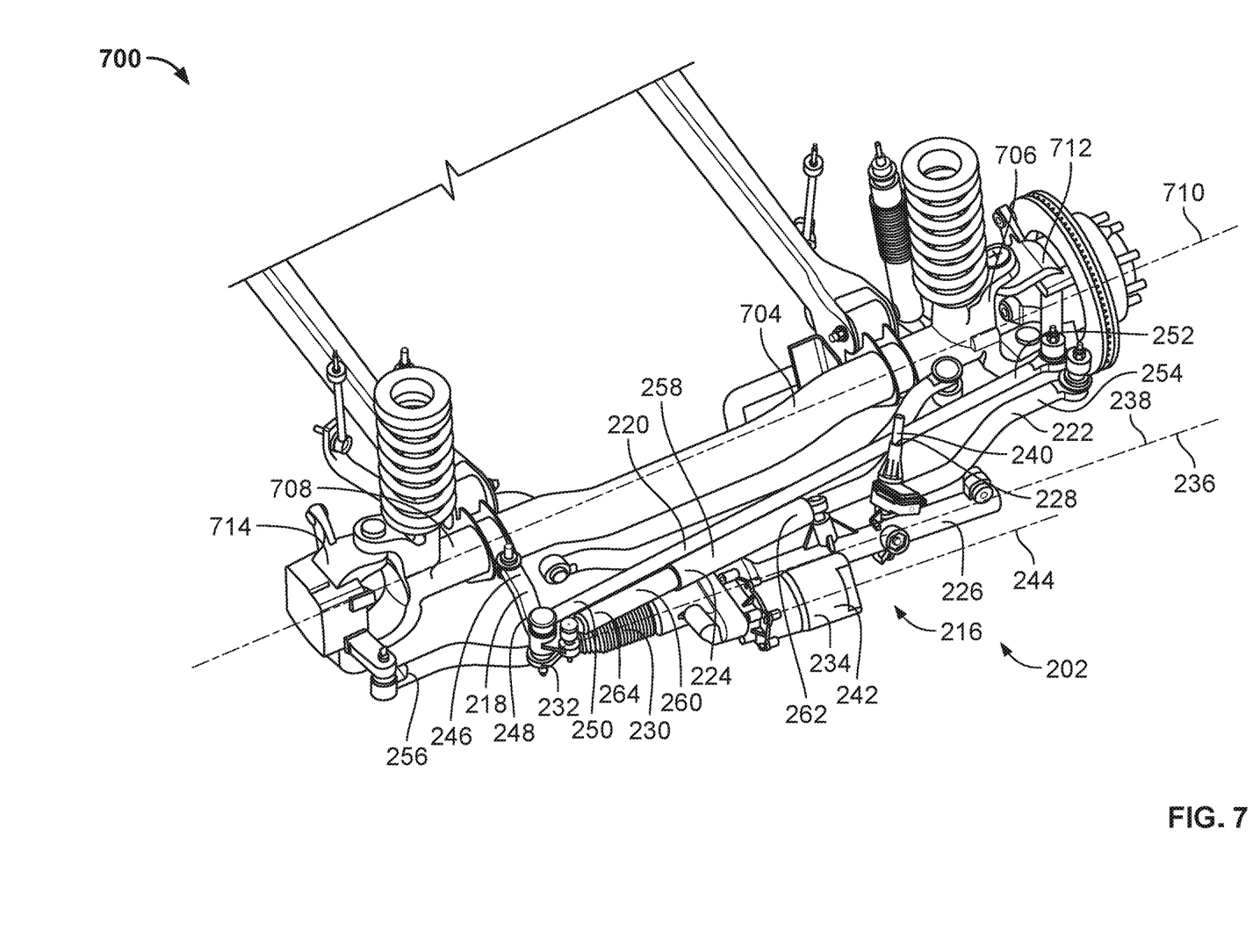
FIG. 7 is a perspective view of an example dead beam solid axle front suspension paired with the example EPAS system of FIGS. 2-6.

FIG. 7 is a perspective view of an example dead beam solid axle front suspension 700 paired with the example EPAS system 202 of FIGS. 2-6. The solid axle front suspension 700 and the EPAS system 202 of FIG. 7 may be implemented in a vehicle such as the vehicle 100 of FIG. 1 described above. The implementation of the EPAS system 202 may occur in the absence and/or to the exclusion of a conventional hydraulically-operated recirculating ball nut gear system, thereby providing the vehicle with the positive tradeoffs described above (e.g., reduced weight, reduced cost, improved performance features, reduced steering system compliance, etc.).

In the illustrated example of FIG. 7, the dead beam solid axle front suspension 700 includes an example solid axle 704 (e.g., a solid beam, rigid beam, mono-beam, etc.) implemented as a dead beam. The solid axle 704 of FIG. 7 includes an example first end 706, an example second end 708 located opposite the first end 706 of the solid axle 704, and an example longitudinal axis 710 extending between the first end 706 and the second end 708 of the solid axle 704. The first end 706 of the solid axle 704 of FIG. 7 is coupled to an example first knuckle 712 (e.g., a left knuckle) of the vehicle associated with a first front wheel (e.g., a left front wheel) of the vehicle. The second end 708 of the solid axle 704 of FIGS. 2-6 is coupled to an example second knuckle 714 (e.g., a right knuckle) of the vehicle associated with a second front wheel (e.g., a right front wheel) of the vehicle.

The first end 706, the second end 708, and the longitudinal axis 710 of the solid axle 704 of FIG. 7 respectively correspond to the first end, 206, the second end 208, and the longitudinal axis 210 of the solid axle 204 of FIGS. 2-6 described above. The first and second knuckles 712, 714 of FIG. 7 respectively correspond to the first and second knuckles 212, 214 of FIGS. 2-6 described above. The EPAS system 202 of FIGS. 2-6 is implemented and/or paired with the dead beam solid axle front suspension 700 of FIG. 7 in a manner that is substantially identical to that described above in connection with the live beam solid axle front suspension 200 of FIG. 2.

From the foregoing, it will be appreciated that the disclosed EPAS systems for solid axle front suspension vehicles provide numerous advantages relative to conventional hydraulically-operated recirculating ball nut gear systems for solid axle front suspension vehicles. For example, in comparison to such hydraulically-operated recirculating ball nut gear systems, the disclosed EPAS systems are relatively lighter and less costly, while also advantageously providing for a broader array of performance features, including driver assist features not available via such hydraulically-operated recirculating ball nut gear systems. Implementing the disclosed EPAS systems in lieu of such hydraulically-operated recirculating ball nut gear systems also advantageously reduces the compliance burdens associated with the steering system.

In some examples, an EPAS system for a solid axle front suspension of a vehicle is disclosed. In some disclosed examples, the EPAS system comprises an idler arm having a first end and a second end. In some disclosed examples, the first end of the idler arm is coupled to a frame of the vehicle. In some disclosed examples, the EPAS system further comprises an EPAS rack assembly. In some disclosed examples, the EPAS rack assembly includes an input shaft, a rack, an electric motor, and an output link. In some disclosed examples, the rack is coupled to the input shaft and is movable in response to movement of the input shaft. In some disclosed examples, the electric motor is coupled to the rack. In some disclosed examples, the electric motor is to provide powered assistance to movement of the rack. In some disclosed examples, the output link has a first end and a second end. In some disclosed examples, the first end of the output link is coupled to the rack. In some disclosed examples, the second end of the output link is coupled to the second end of the idler arm.

In some disclosed examples, the EPAS rack assembly is mounted to the frame of the vehicle. In some disclosed examples, the rack has a longitudinal axis oriented at an angle of between zero and thirty degrees relative to a longitudinal axis of a solid axle of the solid axle front suspension. In some disclosed examples, the electric motor has a drive axis that is parallel to the longitudinal axis of the rack.

In some disclosed examples, the input shaft is coupled to an intermediate steering shaft. In some disclosed examples, the input shaft is movable in response to movement of the intermediate steering shaft. In some disclosed examples, the EPAS rack assembly further includes a rack housing. In some disclosed examples, the rack is slidable relative to the rack housing. In some disclosed examples, the input shaft is rotatable relative to the rack housing. In some disclosed examples, the input shaft is operatively coupled to a pinion gear located within the rack housing. In some disclosed examples, the pinion gear is movable in response to movement of the input shaft, and the rack is movable in response to movement of the pinion gear.

In some disclosed examples, the EPAS system further comprises a drag link having a first end and a second end. In some disclosed examples, the first end of the drag link is coupled to the second end of the idler arm. In some disclosed examples, the second end of the drag link is coupled to a first knuckle of the vehicle.

In some disclosed examples, the EPAS system further comprises a tie rod having a first end and a second end. In some disclosed examples, the first end of the tie rod is coupled to the first knuckle. In some disclosed examples, the second end of the tie rod is coupled to a second knuckle of the vehicle.

In some disclosed examples, the EPAS system further comprises a steering damper having a first end and a second end. In some disclosed examples, the first end of the steering damper is coupled to one of the frame of the vehicle or a rack housing of the EPAS rack assembly. In some disclosed examples, the second end of the steering damper is coupled to one of the idler arm, the drag link, or the tie rod.

In some disclosed examples, the output link is movable in response to movement of the rack, the idler arm is movable in response to movement of the output link, the drag link is movable in response to movement of the idler arm, the first knuckle is movable in response to movement of the drag link, the tie rod is movable in response to movement of the first knuckle, and the second knuckle is movable in response to movement of the tie rod.

In some disclosed examples, a solid axle of the solid axle front suspension extends between the first and second knuckles of the vehicle. In some disclosed examples, the solid axle is one of a live beam or a dead beam.

In some examples, an EPAS system for a solid axle front suspension of a vehicle is disclosed. In some disclosed examples, the EPAS system comprises an idler arm having a first end and a second end. In some disclosed examples, the first end of the idler arm is coupled to a frame of the vehicle. In some disclosed examples, the EPAS system further comprises an EPAS rack assembly mounted to the frame of the vehicle. In some disclosed examples, the EPAS rack assembly includes an input shaft, a rack, an electric motor, and an output link. In some disclosed examples, the input shaft is located on a driver side of the vehicle. In some disclosed examples, the rack is coupled to the input shaft and is movable in response to movement of the input shaft. In some disclosed examples, the electric motor is coupled to the rack. In some disclosed examples, the electric motor is to provide powered assistance to movement of the rack. In some disclosed examples, the output link is located on a passenger side of the vehicle. In some disclosed examples, the output link has a first end and a second end. In some disclosed examples, the first end of the output link is coupled to the rack. In some disclosed examples, the second end of the output link is coupled to the second end of the idler arm.

In some disclosed examples, the rack has a longitudinal axis oriented at an angle of between zero and thirty degrees relative to a longitudinal axis of a solid axle of the solid axle front suspension.

In some disclosed examples, the EPAS system further comprises a drag link having a first end and a second end. In some disclosed examples, the first end of the drag link is coupled to the second end of the idler arm. In some disclosed examples, the second end of the drag link is coupled to a first knuckle of the vehicle.

In some disclosed examples, the EPAS system further comprises a tie rod having a first end and a second end. In some disclosed examples, the first end of the tie rod is coupled to the first knuckle. In some disclosed examples, the second end of the tie rod is coupled to a second knuckle of the vehicle.

In some disclosed examples, the EPAS system further comprises a steering damper having a first end and a second end. In some disclosed examples, the first end of the steering damper is coupled to one of the frame of the vehicle or a rack housing of the EPAS rack assembly. In some disclosed examples, the second end of the steering damper is coupled to one of the idler arm, the drag link, or the tie rod.

In some disclosed examples, the output link is movable in response to movement of the rack, the idler arm is movable in response to movement of the output link, the drag link is movable in response to movement of the idler arm, the first knuckle is movable in response to movement of the drag link, the tie rod is movable in response to movement of the first knuckle, and the second knuckle is movable in response to movement of the tie rod.

In some disclosed examples, a solid axle of the solid axle front suspension extends between the first and second knuckles of the vehicle. In some disclosed examples, the solid axle is one of a live beam or a dead beam.

Although certain example apparatus and articles of manufacture have been disclosed herein, the scope of coverage of this patent is not limited thereto. On the contrary, this patent covers all apparatus and articles of manufacture fairly falling within the scope of the claims of this patent.

What is claimed is:

1. An electric power assisted steering (EPAS) system for a solid axle front suspension of a vehicle, the EPAS system comprising:
    an idler arm having a first end and a second end, the first end of the idler arm being coupled to a frame of the vehicle; and
    an EPAS rack assembly including:
        an input shaft;
        a rack coupled to the input shaft, the rack being movable in response to movement of the input shaft;
        an electric motor coupled to the rack, the electric motor to provide powered assistance to movement of the rack; and
        an output link having a first end and a second end, the first end of the output link being coupled to the rack, the second end of the output link being coupled to the second end of the idler arm.

2. The EPAS system of claim 1, wherein the EPAS rack assembly is mounted to the frame of the vehicle.

3. The EPAS system of claim 1, wherein the rack has a longitudinal axis oriented at an angle of between zero and thirty degrees relative to a longitudinal axis of a solid axle of the solid axle front suspension.

4. The EPAS system of claim 3, wherein the electric motor has a drive axis that is parallel to the longitudinal axis of the rack.

5. The EPAS system of claim 1, wherein the EPAS rack assembly further includes a rack housing, the rack being slidable relative to the rack housing, the input shaft being rotatable relative to the rack housing.

6. The EPAS system of claim 5, further comprising a drag link having a first end and a second end, the first end of the drag link being coupled to the second end of the idler arm, the second end of the drag link being coupled to a first knuckle of the vehicle.

7. The EPAS system of claim 6, further comprising a tie rod having a first end and a second end, the first end of the tie rod being coupled to the first knuckle, the second end of the tie rod being coupled to a second knuckle of the vehicle.

8. The EPAS system of claim 7, further comprising a steering damper having a first end and a second end, the first end of the steering damper being coupled to the rack housing, the second end of the steering damper being coupled to the idler arm.

9. The EPAS system of claim 7, wherein the output link is movable in response to movement of the rack, the idler arm is movable in response to movement of the output link, the drag link is movable in response to movement of the idler arm, the first knuckle is movable in response to movement of the drag link, the tie rod is movable in response to movement of the first knuckle, and the second knuckle is movable in response to movement of the tie rod.

10. The EPAS system of claim 7, wherein a solid axle of the solid axle front suspension extends between the first and second knuckles of the vehicle.

11. The EPAS system of claim 10, wherein the solid axle is one of a live beam or a dead beam.

12. An electric power assisted steering (EPAS) system for a solid axle front suspension of a vehicle, the EPAS system comprising:
- an idler arm having a first end and a second end, the first end of the idler arm being coupled to a frame of the vehicle; and
- an EPAS rack assembly mounted to the frame of the vehicle, the EPAS rack assembly including:
  - an input shaft located on a driver side of the vehicle;
  - a rack coupled to the input shaft, the rack being movable in response to movement of the input shaft;
  - an electric motor coupled to the rack, the electric motor to provide powered assistance to movement of the rack; and
  - an output link located on a passenger side of the vehicle, the output link having a first end and a second end, the first end of the output link being coupled to the rack, the second end of the output link being coupled to the second end of the idler arm.

13. The EPAS system of claim 12, wherein the rack has a longitudinal axis oriented at an angle of between zero and thirty degrees relative to a longitudinal axis of a solid axle of the solid axle front suspension.

14. The EPAS system of claim 12, further comprising a drag link having a first end and a second end, the first end of the drag link being coupled to the second end of the idler arm, the second end of the drag link being coupled to a first knuckle of the vehicle.

15. The EPAS system of claim 14, further comprising a tie rod having a first end and a second end, the first end of the tie rod being coupled to the first knuckle, the second end of the tie rod being coupled to a second knuckle of the vehicle.

16. The EPAS system of claim 15, further comprising a steering damper having a first end and a second end, the first end of the steering damper being coupled to a rack housing of the EPAS rack assembly, the second end of the steering damper being coupled to the idler arm.

17. The EPAS system of claim 15, wherein the output link is movable in response to movement of the rack, the idler arm is movable in response to movement of the output link, the drag link is movable in response to movement of the idler arm, the first knuckle is movable in response to movement of the drag link, the tie rod is movable in response to movement of the first knuckle, and the second knuckle is movable in response to movement of the tie rod.

18. The EPAS system of claim 15, wherein a solid axle of the solid axle front suspension extends between the first and second knuckles of the vehicle, the solid axle being one of a live beam or a dead beam.

19. The EPAS system of claim 1, wherein the solid axle front suspension of the vehicle is not coupled to a recirculating ball nut steering gear mechanism.

20. The EPAS system of claim 12, wherein the solid axle front suspension of the vehicle is not coupled to a recirculating ball nut steering gear mechanism.

* * * * *